United States Patent
Perham

(10) Patent No.: US 7,437,665 B2
(45) Date of Patent: Oct. 14, 2008

(54) SEF PARSER AND EDI PARSER GENERATOR

(75) Inventor: Michael Perham, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 862 days.

(21) Appl. No.: 10/948,725

(22) Filed: Sep. 23, 2004

(65) Prior Publication Data
US 2006/0036522 A1 Feb. 16, 2006

Related U.S. Application Data

(60) Provisional application No. 60/590,744, filed on Jul. 23, 2004.

(51) Int. Cl.
*G06F 17/00* (2006.01)
(52) U.S. Cl. ............... 715/234; 715/234; 705/35
(58) Field of Classification Search ............ 715/234, 715/200; 705/35, 37–38
See application file for complete search history.

(56) References Cited

U.S. PATENT DOCUMENTS

| | | | |
|---|---|---|---|
| 2002/0049790 A1* | 4/2002 | Ricker et al. ............... 707/513 |
| 2003/0131071 A1* | 7/2003 | Bennett et al. ............. 709/218 |
| 2003/0158805 A1* | 8/2003 | Mozhdehi .................... 705/37 |
| 2004/0039692 A1* | 2/2004 | Shields et al. ............... 705/39 |
| 2006/0036522 A1* | 2/2006 | Perham ....................... 705/35 |

* cited by examiner

*Primary Examiner*—Thu Huynh
(74) *Attorney, Agent, or Firm*—Stevens & Showalter LLP

(57) ABSTRACT

A SEF grammar is created to be used with the Java CC program to autogenerate a SEF parser. The SEF parser can be run with specially written X12 code on any SEF file to automatically create an EDI object model for that SEF file. A programmer can then write application code to use the EDI object model to parse an EDI document that the SEF file describes and generate in memory an EDI object model instance for that EDI document. The application code is also used to employ the EDI object model instance to efficiently process the EDI document's EDI transaction. In addition, the application code is used to employ the EDI object model on the EDI object model instance to emit an EDI document for further use.

20 Claims, 11 Drawing Sheets

Use the application code 536 to generate a specific EDI object model instance 530.
2200

Obtain a specific EDI document 532.
2210

Run the application code 536 to use the EDI object model 520 on the EDI document 532.
2220

Fig 8

SEF PARSER AND EDI PARSER GENERATOR

CROSS-REFERENCE TO RELATED APPLICATIONS

This application claims the benefit of PPA Ser. No. 60/590,744 filed Jul. 23, 2004 by the present inventor.

COPYRIGHT NOTICE

A portion of the disclosure of this patent document contains material which is subject to copyright protection. The copyright owner has no objection to the facsimile reproduction by any one of the patent document or the patent disclosure, as it appears in the Patent and Trademark Office patent file or records, but otherwise reserves all copyright whatsoever.

FIELD OF THE INVENTION

This innovation relates to methods that enable programmers and programs to more efficiently process data in Electronic Data Interchange (EDI) transactions.

BACKGROUND OF THE INVENTION

For speed of communications and cost effectiveness, individuals, businesses, and other organizations frequently exchange electronic data through e-mail, the Internet, and other networks and systems. For example, companies increasingly rely on the Internet to obtain loosely coupled Web services deployed by Web service providers on application-based servers, which are computers on networks that manage the networks.

Web services are business-enterprise computer applications that can be utilized singly or collectively to accomplish a wide range of intended purposes, such as determining health-care patients' eligibility for benefits, submitting health-care claims, and providing stock quotes. Web services help companies dramatically cut costs, increase revenues, and improve competitive agility by combining existing, heterogeneous systems into cross-functional, multi-company applications.

FIG. 1 shows an example of how multiple chained Web services are typically used as part of a Web service application for the filing and payment of medical insurance claims. Chained Web services are loosely connected Web services that may reside on different servers and that may be provided by separate businesses. Web services applications are computer applications that use Web services singly or collectively to accomplish intended purposes. A Web service provider employs a server 100 running a Web portal page 200 and a Web service application 300.

A Web portal page 200 is a Web site interface that a person can reach over the Internet. Web site interfaces typically are computer-programmed modules that allow end-users to select variables and parameters from easy-to-use visual displays or to type in this input, save the information through selecting a save option, and have their selections automatically applied by computer subsequently, without those users having to program the information manually.

In the example for FIG. 1, an attendant at a clinic computer 150 can use the Internet, through a wired link 144, a telephone network 130, and another wired link 142, to reach the portal Web page 200 on the Web service provider server 100. The attendant can then use the portal Web page 200 to fill out a claim file form 220 for one of the clinic's patients and submit the form as an electronic data file to Web service application 1 300.

Other means for submitting claims also exist. For example, an attendant at a clinic computer 150 might use link 144, network 130, and link 142 for a machine-to-machine transmission of a claim file directly to Web service application 1 300. Many kinds of wired and unwired links and networks could be used for this machine-to-machine transmission, such as the Internet, a private LAN (Local Area Network), a wireless network, a TCP/IP (Transmission Control Protocol/Internet Protocol) network, or other communications system.

To continue with the example, Web service application 1 300 receives each claim file through Web service 1 410, which relays the claim data in an electronic data file back over link 142, network 130, and link 143 to server 2 182. If necessary, Web service 2 420 then transforms the format of the claim file to a format that Web service application 1 300 can use for its full 30 operations. For example, a claim file might have been sent in NSF (National Standard Format) format, but Web service application 1 300 might require HIPAA (Health Insurance Portability and Accountability Act) format.

After the claim file is transformed to the correct message format, Web service 2 420 relays the claim data in an electronic data file back over link 143, network 130, and link 145 to server 3 184 and Web service 3 430, which is used to validate the claim file. In turn, Web service 3 430 relays the claim data in an electronic data file back over link 145, network 130, and link 147 to server 4 186 and Web service 4 440. Web service 4 440 is used to send the claim data in an electronic data file back over link 147, network 130, and link 148 to an insurance company-server 170 for payment to the clinic.

Electronic Data Interchange (EDI)

To help establish compatibility for electronic data exchanges such as the one outlined in FIG. 1, the American National Standards Institute (ANSI) Accredited Standards Committee (ASC) has developed a set of standards for electronic data interchange (EDI) called the X12 standards, which defines the content and structure for data contained in electronic data files. For example, in EDI X12, a standard HIPAA (Health Insurance Portability and Accountability Act) "837P" document represents an electronic data file used for filing patient claims to a health insurer. To follow the example used with FIG. 1, the electronic data file created by Web service 1 410 could be an 837P document.

Example of an EDI Document

An EDI document is a flat list of text, the divisions of which are not easy to determine. The following, abbreviated code shows a typical EDI document:

```
ISA*00*        *00*        *ZZ*WEBIFYSE        *ZZ*00AAA
*020220*1243*U*00401*100000034*0*T*:~GS*HS*WEBIFYSE*00AAA*20020220*2314
*123456789*X*004010X092A1~ST*270*3120~BHT*0022*13*10001234*19990501
*103045*RT~HL*1**20*1~NM1*PR*2*Sample
```

-continued

```
BCBS*****FI*999999999~HL*2*1*21*1~NM1*1P*2*Sample
Clinic*****FI*888888888~REF*1J*0035~HL*3*2*22*0~TRN*1*93175-
012547*9323233345~NM1*IL*1*SMITH*JOHN*M***MI*333440623~DMG*D8*19510918
~DTP*472*RD8*20031201-
20031201~EQ*30**FAM*GP~SE*14*3120~GE*1*123456789~IEA*1*100000034~
```

In this EDI document, the elements ST and SE represent the start and end of a business transaction, called an EDI transaction, that may contain many additional elements, as shown in the following segment extracted from the example given above:

```
ST*270*3120~BHT*0022*13*10001234*19990501*103045*RT~HL*1**20*1~NM1*PR
*2*Sample BCBS*****FI*999999999~HL*2*1*21*1~NM1*1P*2*Sample
Clinic*****FI*888888888~REF*1J*0035~HL*3*2**22*0~TRN*1*93175-
012547*9323233345~NM1*IL*1*SMITH*JOHN*M***MI*333440623~DMG*D8*19510918
~DTP*472*RD8*20031201-20031201~EQ*30**FAM*GP~SE
```

Example of an EDI Transaction

The following line shows a typical segment of an EDI transaction in an 837P document:

NM1*H*DOE*JOHN*78747

In this example, the letters "DOE" might represent the last name of a specific individual. The field where "DOE" appears might indicate the last name of a patient submitting a claim. Similarly, the numbers "78747" might represent a specific individual's zip code and the field where "78747" appears might indicate the zip code of a patient filing a claim.

Problems with EDI Documents

Programmers and automatic programs often must work with multiple segments of EDI transactions, comprising hundreds of lines of difficult-to-read code, to create, test, and correct related EDI documents and transactions.

For example, in the system shown in FIG. 1, suppose that the person who submits a claims file mistypes a patient's zip code. In such a case, Web service 3 430 might run an error-checking program and compare patient names and zip codes in claims with those in a central database. After discovering the erroneous zip code, Web service 3 430 might then run a correction program to substitute the correct zip code. However, creating such error-detection and correction programs with current methods typically requires low-level string manipulation of code, involving counting the stars (*) and characters in EDI segments and fields to find the desired data and create programs to manipulate it.

Alternately, human operators might have to become involved to ensure that the patient's claims data is correct, by sorting through potentially hundreds of lines of code and making changes manually.

Furthermore, the data in specific fields in EDI segments may have different meanings in different contexts, so that the same field in different 837P documents may need to be interpreted differently. For example, a patient from Texas who is injured while on vacation in California and who files a claim from a clinic there might have the clinic's California zip code attached to his claims file instead of the Texas zip code that would normally be associated with him for routing his claim. Such context-based differences may require much additional time and effort by programmers or operators who have to sort through EDI segments and interpret them.

Because of these problems, current automatic or manual methods of finding, revising, and otherwise manipulating specific fields in large EDI transactions are time consuming and expensive.

US patent application number 20020049790 to Ricker describes a method to express EDI document as XML documents with tags that give human-readable context to the data near that tag. But that method does not address the present invention's object-based method of creating a SEF (Standard Exchange Format) parser and EDI parser generator to make EDI transactions more efficient to read and modify by both human operators and machines.

Therefore there is a need for a method and system that provides a more automatic method for efficiently processing data in Electronic Data Interchange (EDI) transactions, for example for reading and modifying such.

BRIEF SUMMARY OF THE INVENTION

These and other needs are addressed by the present invention. The following explanation describes the present invention by way of example and not by way of limitation.

It is an aspect of the present invention to provide an automatic method for processing, for example reading and modifying, Electronic Data Interchange (EDI) transactions.

It is another aspect of the present invention to provide a SEF grammar that can be used to generate a SEF parser.

It is another aspect of the present invention to provide X12 code that can be used to represent various X12 objects within SEF files.

It is another aspect of the present invention to provide a SEF parser that can parse any SEF file into an EDI object model for that SEF file.

It is another aspect of the present invention to provide an EDI object model that can be used to generate from an EDI document an EDI object model instance;

It is another aspect of the present invention to provide application code to use the EDI object model to process, for example to parse, modify, and emit, an EDI document;

These and other aspects, features, and advantages are achieved according to the method and apparatus of the present invention. In accordance with the present invention, a SEF grammar is created to be used with the Java CC program to autogenerate a SEF parser. The SEF parser can be run with specially written X12 code on any SEF file to automatically create an EDI object model for that SEF file. A programmer can then write application code to use the EDI object model to parse an EDI document that the SEF file describes and generate in memory an EDI object model instance for that EDI document. The application code is also used to employ the EDI object model instance to efficiently process the EDI document's EDI transaction. In addition, the application code is used to employ the EDI object model on the EDI object model instance to emit an EDI document for further use.

BRIEF DESCRIPTION OF THE DRAWINGS

The following embodiment of the present invention is described by way of example only, with reference to the accompanying drawings, in which:

FIG. 8 is a flow chart that illustrates a process for generating a specific EDI object model instance;

DETAILED DESCRIPTION

The following description explains a system and method to efficiently read and manipulate an EDI document's EDI transaction. The details of this explanation are offered to illustrate the present invention clearly. However, it will be apparent to those skilled in the art that the concepts of present invention are not limited to these specific details. Commonly known elements are also shown in block diagrams for clarity, as examples and not as limitations of the present invention.

Operating Environment

Figure 2:
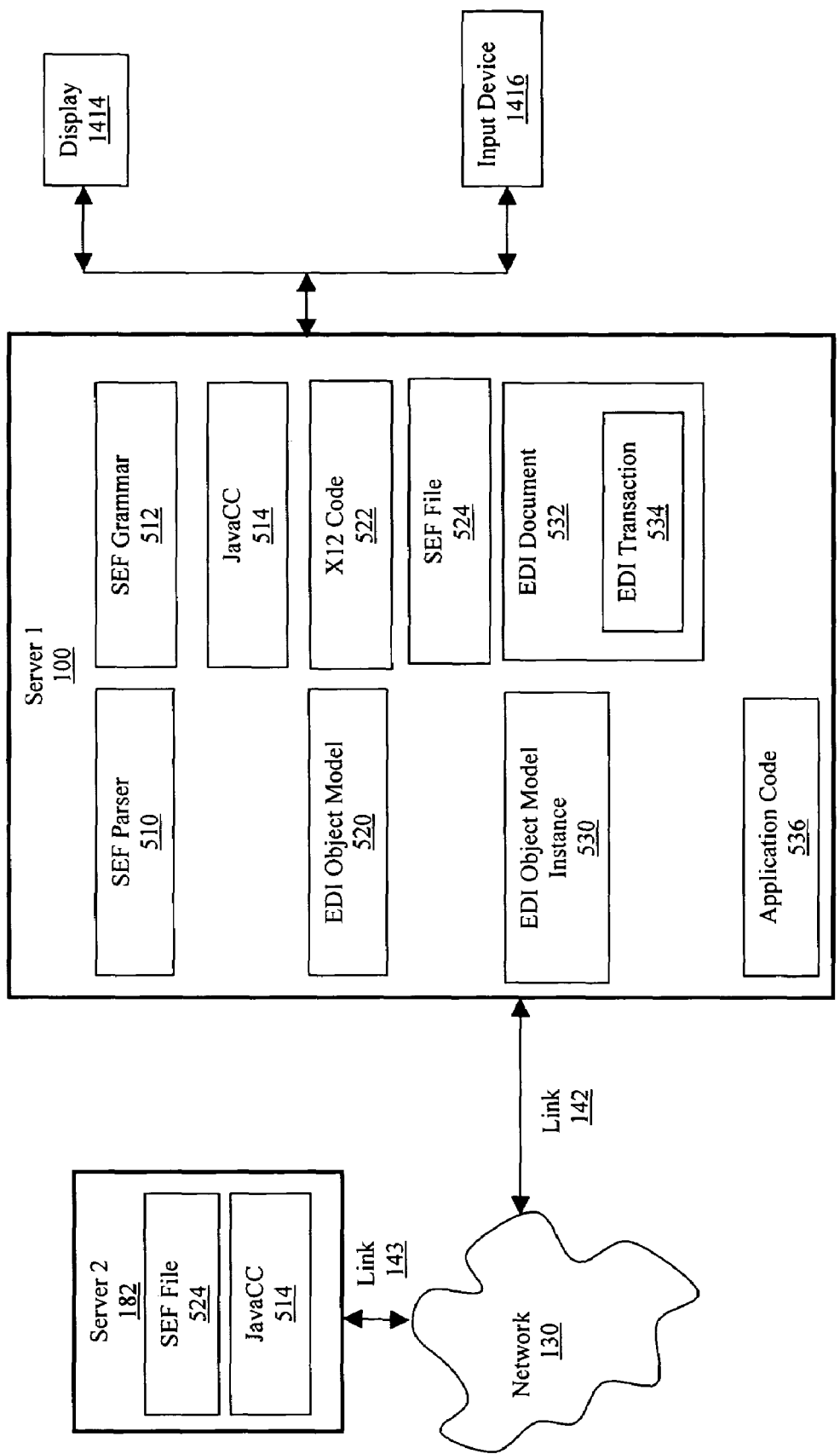
FIG. 2 is a block diagram showing an operating environment in which embodiments of the present invention may be employed.

An embodiment of an operating environment of the present invention is shown in FIG. 2. A party employs a server 100 to work with an EDI document 532 containing an EDI transaction 534. A server may be a personal computer or a larger computerized system.

The server 100 can communicate through a wired or wireless network 130 and wired or wireless links 142 and 143 with another server 182. The network 130 may be the Internet, a private LAN (Local Area Network), a wireless network, a TCP/IP (Transmission Control Protocol/Internet Protocol) network, or other communications system, and may comprise multiple elements such as gateways, routers, and switches. The links 142 and 143 are compatible with the technology used for network 130.

Process for Reading and Manipulating EDI Data

Figure 3:
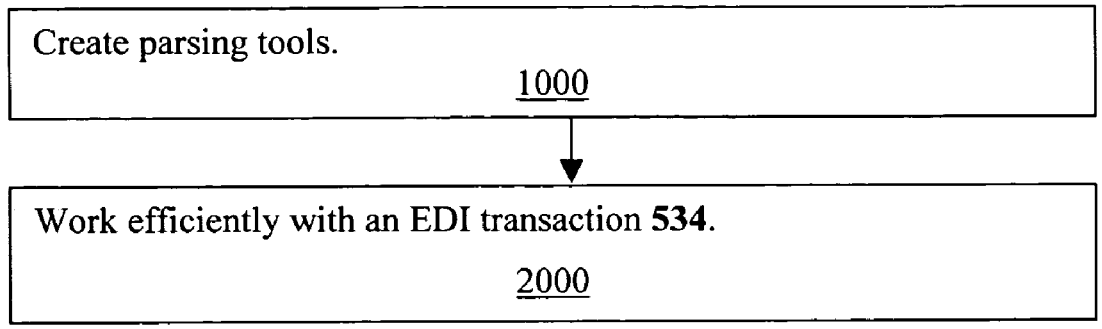
FIG. 3 is top-level flow chart that illustrates a process for providing an automatic method for easily processing data in Electronic Data Interchange (EDI) transactions.

FIG. 3 is top-level flow chart that illustrates an embodiment of a process for providing an automatic method for efficiently processing, for example reading and modifying, data in EDI transactions in the embodiment shown in FIG. 2. It will be useful to explain the steps in this process briefly from a high level and then to expand elements of this explanation in detail.

Step 1000 in FIG. 3. Create parsing tools.

In an embodiment explained in more detail below, a programmer uses input device 1416, shown in FIG. 2, and display 1414 to create parsing tools, comprising a SEF parser 510 and an EDI object model 520.

Step 2000 in FIG. 3. Work Efficiently with an EDI Transaction 534.

In an embodiment, a programmer creates application code 536, shown in FIG. 2, to run the EDI object model 520 on a specific EDI document 532 to generate in memory a specific EDI object model instance 530. In addition, the application code 536 is used to employ the EDI object model instance 530 to perform desired operations on the EDI transaction 534 much more efficiently than prior methods can. In addition, the application code 536 is used to employ the EDI object model 520 on the EDI object model instance 530 to emit the EDI document for further use.

Creating Parsing Tools

Figure 4:
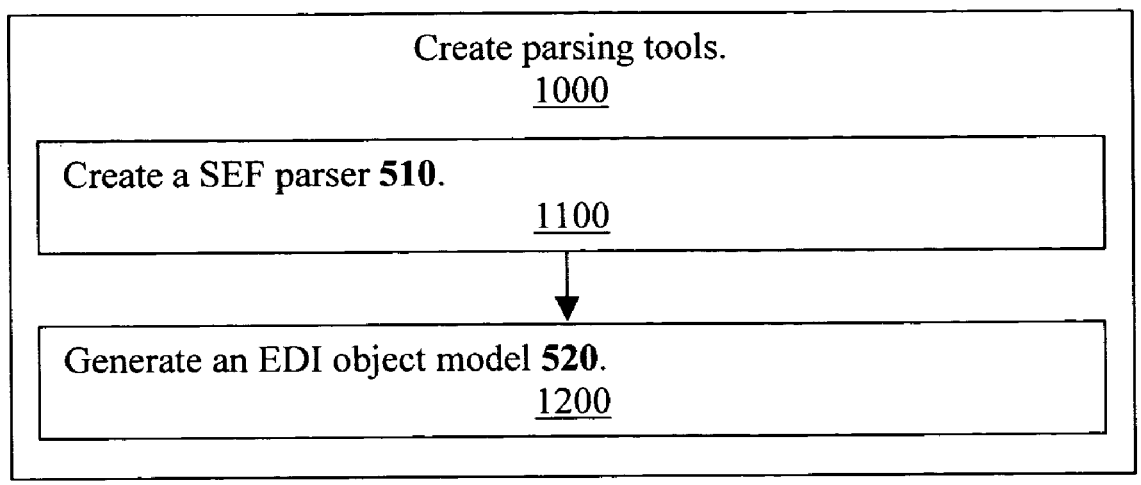
FIG. 4 is a flow chart that illustrates a process for creating parsing tools.

FIG. 4 shows an embodiment of the steps for creating parsing tools in Step 1000 of FIG. 3.

Step 1100 in FIG. 4. Create a SEF parser 510.

In an embodiment, a programmer creates a program to parse SEF files to make them easier to work with.

SEF Files

A SEF (Standard Exchange Format) file 524, shown in FIG. 2, is an open-standard, machine-readable format file that defines the implementation guidelines of an EDI document 532, including information on the EDI transaction 534 elements. Programmers have written many SEF files for EDI documents and made them available openly on the Internet.

For example, someone might use the Internet to find a SEF file describing the syntax of an 837P interchange document for claims filing. Another SEF file might describe the syntax of a 270 interchange document, which is used to request evaluation of the eligibility of patient claims. Yet another SEF file might describe the syntax of a 271 interchange document used to respond to patient-eligibility-evaluation requests.

Figure 1:
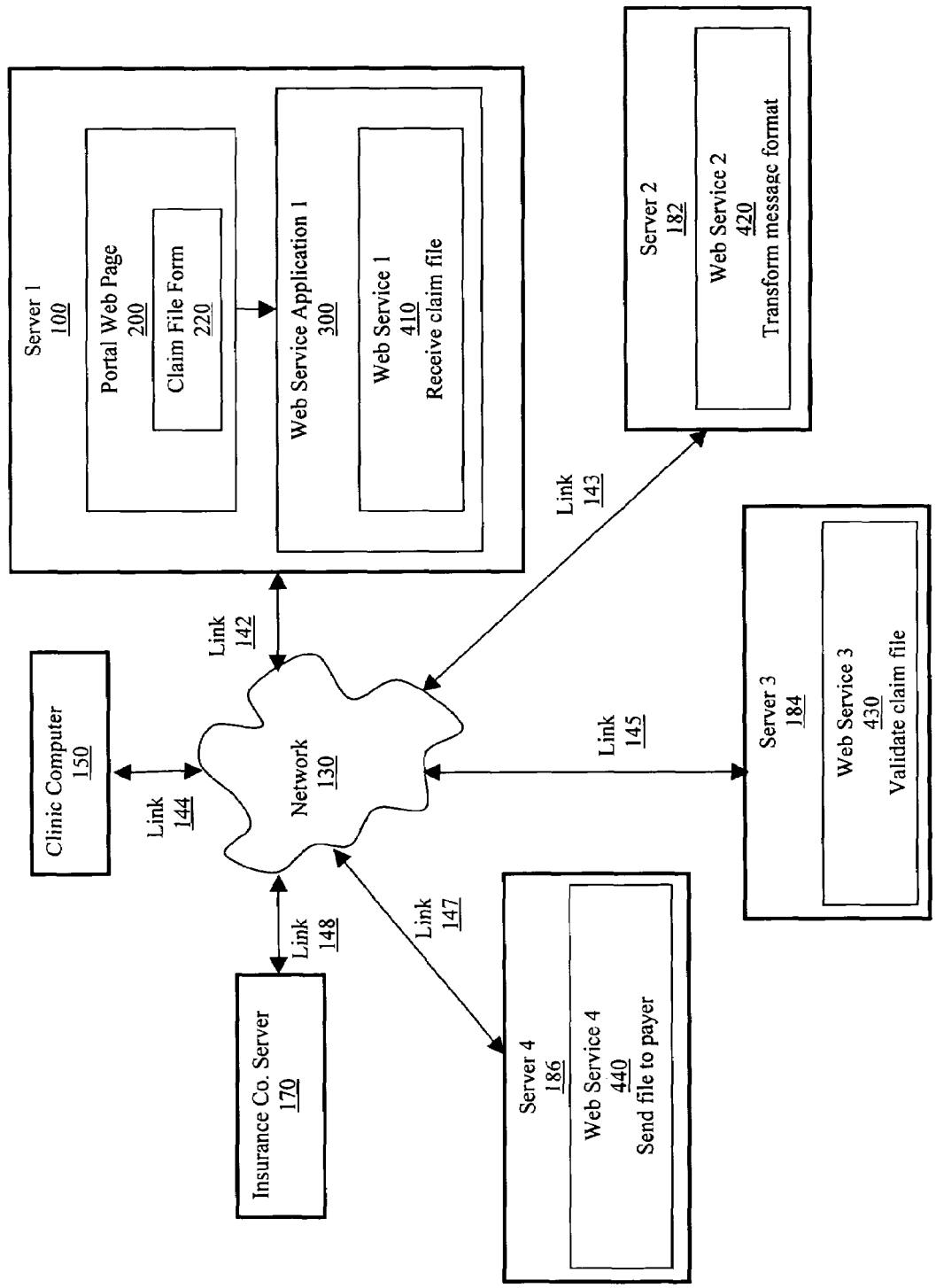
FIG. 1 is a block diagram showing an example of loosely connected Web services chained together through a Web service application for filing patient claims.

In the example of FIG. 1, party at server 1 100 could, for example, use link 142, network 130, and link 143 to obtain a SEF file 524 for an 827P interchange document 532 from another computer such as server 2 182.

SEF files are useful for reading and modifying EDI documents, but are still complicated to read and manipulate. The following is an example of typical code in a SEF file:

```
.SEGS
NM1 = [80] [237] [50] [50] [76]
.
.
.
.EMS
76 = N, 5
```

In this example, the data structure [76] in the field on the far right of the first line is identified by the last line as containing five digits, such as a zip code might use.

The following, more lengthy example of a small opening section of a SEF file, extracted from hundreds of additional lines, shows a SEF file's detail, complication, and comparative difficulty to read:

```
.VER 1.3
.INI
270__X092A1,,004 010 X092A1,X,X12-4010,Health Care Eligibility
Coverage or Benefit Inquiry
.PRIVATE EDIdEv
.LOOP1 270/2/HL/3/0/20/2000A
.LOOP2 270/2/HL/3/0/21/2000B
.LOOP3 270/2/HL/3/0/22/2000C
.LOOP4 270/2/HL/3/0/23/2000D
.DATE 2/10/2003
.PUBLIC
.SETS
270=^[!ST*1,M][!BHT*1,M]^{2000A:>1[!HL*1,M]{2100A+20[!NM1*1,M]}}{2000B
:>1-
20[!HL*2,M]{2100B+20[!NM1*1,M]+10[REF*1,,9]+20[N3*1]+10[N4*1][PER*1,,
3][PRV*1]}}{2000C:>1-
80[!HL*2,M]+10[TRN*1,,2]{2100C[!NM1*2,M][REF*2,,9]+20[N3*1]+10[N4*2]+
20[PRV*1]+10[DMG*1][INS*1][DTP*1,,2]{2110C:99[EQ*2]+5[AMT*1]+35[III*1
,,10]+20[REF*2]+10[DTP*1]}}}{2000D:>1-
190[HL*2]+10[TRN*1,,2]{2100D[!NM1*3,M][REF*2,,9]+20[N3*1]+10[N4*2]+20
[PRV*1]+10[DMG*1][INS*2][DTP*1,,2]{2110D:99[!EQ*2]+40[III*1,,10]+20[REF
*2]+10[DTP*1]}}}[!SE*1,M]
.SEGS
AAA=[1073,M][559][901][889]
ACD=[1636][650][1262]
ACK=[668,M][380][355][374][373][326]{10[235][234]}[559][822][1271]+P0
203C0405P0708P0910P1112P1314P1516P1718P1920P2122P2324P2526P2728C282729
ACS=[610,M][150,M][352][146]
ACT=[508,M][93][66][67][569][508][352][107][1216]+P0304C0506C0705
AD1=[426,M][782][1129][594][9]
ADI=[1606,M][373,M][1313][344]+P0304
ADJ=[952,M][782,M][782]{2[373,M]}[1470][352][235][234]{3[610]}{3[380]
}[128][127]+P0809L101112C1009L111012C1109L121011C1209C1309L131415C140
9L141315C1509L151314P1617C1709
ADT=[1619,M]{2[373][1313][344]}[337][1313][344]+P0304P0607P0910
ADV=[559,M][1000,M][740][741][729][1000][739]+P0607
ADX=[782,M][426,M][128][127]+P0304
AEI=[40,M][380,M][1073,M]
```

SEF Grammar

Figure 5:
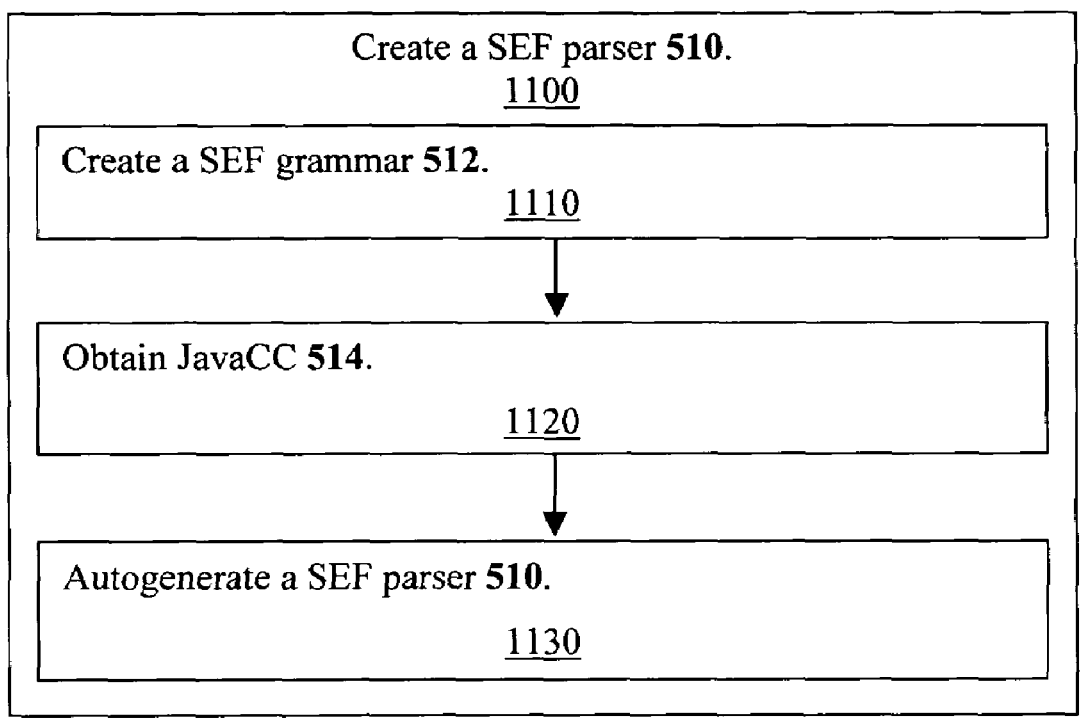
FIG. 5 is a flow chart that illustrates a process for creating a SEF parser.

To create a SEF parser 510, as shown in Step 1100 in FIG. 4, a programmer may use the steps shown in FIG. 5.

Step 1110 in FIG. 5. Create a SEF Grammar 512.

In an embodiment, a SEF grammar 512 is a software program to be used with the JavaCC (compiler compiler) program 514, shown in FIG. 2, to automatically create a SEF parser 510 that can read and interpret any SEF file 524 line by line and create a Java X12 object model for that SEF file 524. The SEF grammar 512 describes the format of SEF files line by line.

Example of a SEF Grammar

The N4 segment in an 837P EDI document 532 typically contains the following data:

N4*<city>*<state>*<zip>~

In a SEF file 524, shown in FIG. 2, the corresponding SEF segment description looks like this:

```
N4=[19][156][116][26][309][310]+C0605,@@@.#C#,....#C#
Field 116 (zip code) is defined like this:
116=ID,3,15
```

This description means that field 116 is between 3 and 15 characters in length and is a codeset (i.e. its values are limited to a pre-defined set, in this case the set of legal zip codes as defined by the US Postal Service).

A SEF grammar 512 written to parse that SEF segment is shown in the following example:

```
void segments( ) :
{ Token segName; }
{
  <SEGMENTS>
  linebreak( )
  (
    segName = identifier( )
    {
      handler.startSegment(segName.image);
    }
    <EQUALS>
    ( field_group( ) | field( ) )+
    [ <PLUS> field_rules( )  ]
    [ <COMMA> ( mask( ) )+  ]
```

```
    linebreak( )
    {
        handler.endSegment( );
    }
    )+
}
void field( ) :
{ Token fieldName, ordinal = null, optional = null; }
{
        <LBRACKET>
        [ ( <BANG>   | <DOLLAR>   | <PERIOD>   | <MINUS>   | <AMP>   ) ]
        fieldName = identifier( )
        [  <AT>    ordinal = number( )    ]
        [  <SEMICOLON>   [ number( ) ]    <COLON> number( )    ]
        [  <COMMA>    optional = <LETTER>   [ <COMMA> number( )   ]]
        <RBRACKET>
        {
            handler.addFieldReference(getValue(fieldName), (ordinal
!= null ? Short.parseShort(ordinal.image) : 0),
                    (optional != null ? !"M".equals(optional.image) :
true));
        }
    }
}
```

Note that the SEF grammar 512 sees the start of a segment and calls startSegment( ) with the name of the segment. This creates the X12Segment object. The SEF grammar 512 also iterates through each field and calls addFieldReference( ) with the field info. Moreover, the SEF grammar 512 calls endSegment( ) to finish the segment.

JavaCC

Step 1120 in FIG. 5. Obtain JavaCC 514.

For use with the SEF grammar 512, a programmer may obtain JavaCC 514, which is a software program widely available through the Internet. For example, a party at server 1 100, as shown in FIG. 2, could use link 142, network 130, and link 143 to obtain JavaCC 512 from another computer such as server 2 182.

SEF Parser

Step 1130 in FIG. 5. Autogenerate a SEF parser 510.

A programmer runs the SEF grammar 512 with JavaCC 514 to autogenerate a SEF parser 510.

EDI Object Model

Returning to FIG. 4, after creating a SEF parser 510 a programmer may continue to the following step:

Step 1200 in FIG. 4. Generate an EDI object model 520.

A programmer may create an EDI object model 520 for a specific SEF file 524, as shown in FIG. 2, for example a SEF file 524 about an 837P interchange document. An EDI object model 520 is code that represents the data structures of the SEF file 524. The EDI object model 520 is a set of potentially hundreds of Java objects associated with the SEF file 524, where each Java object represents an X12 instance of an element in a SEF file 524. One purpose for creating an EDI object model 520 is that it can be used to parse an EDI transaction 534 in an EDI document 532 into an EDI object model instance 530, which is a tree of Java objects comprising code and data about the EDI document 532.

An EDI object model 520 can also be used on such an EDI object model instance 530 to emit an EDI document 532, which might, for example, be used further in a chained system.

Once an EDI object model 520 has been created for a specific EDI document 532, that EDI object model 520 can be made available to potentially multiple programmers to enable them to more efficiently read and manipulate that type of EDI document 532.

EDI Objects

In an embodiment, an EDI object within an EDI object model 520 comprises parse( ), emit( ) and createCopy( ) methods which are useful for recursively creating the tree of objects representing an EDI interchange, creating an EDI interchange from the tree of objects, and creating a copy of the tree of objects, respectively.

The following code shows elements of a typical EDI object in one embodiment:

```
package com.webify.shared.edi.model.hipaa837p.beans;
import com.webify.shared.edi.model.*;
import java.io.*;
import java.util.*;
import org.apache.commons.logging.Log;
import org.apache.commons.logging.LogFactory;
/*
 * AUTOGENERATED FILE - DO NOT EDIT!!!
 */
public class SegmentNM1_1 implements EDIElement {
    private static final Log log =
LogFactory.getLog(SegmentNM1_1.class);
public static final String SEGMENT_NAME = "NM1";
    .
    .
    .
    public void parse(EDIInputStream eis) throws IOException {
        lineNumber = eis.getCurrentSegmentNumber( );
    .
    .
    .
    public void emit(EDIOutputStream eos) throws IOException {
    .
    .
    .
    public EDIElement createCopy( ) {
        SegmentNM1_1 copy = new SegmentNM1_1( );
        copy.setLineNumber(this.lineNumber);
        copy.NM101 = this.NM101;
        copy.NM102 = this.NM102;
        copy.NM103 = this.NM103;
        copy.NM104 = this.NM104;
        copy.NM105 = this.NM105;
        copy.NM108 = this.NM108;
```

```
          copy.NM109 = this.NM109;
          return copy;
```

Advantages of an EDI Object Model

The EDI object model 520, shown in FIG. 2, makes working with EDI documents, such as 532, much easier because the EDI object model 520 organizes the structure of a specific EDI transaction 534 intelligibly and makes this structure available to the application developer.

For example, suppose a programmer wants to change to 78757 the zip code of the 56th subscriber in a HIPAA 837P EDI document. To find the exact item to change is nearly impossible if the programmer can only work with the file for EDI document 532 at the textual level shown below:

```
byte[ ] edibytes = ...
String content = new String(edibytes);
int i = 56;    // subscriber to find
int idx = content.indexOf("HL*22*");
String newzip = "78757";
while (idx != -1) {
    i--;
    if (i == 0) {
        int idx = content.indexOf(idx, "N4*");
        i = 3;
        while (idx != -1) {
            i--;
            if (i == 0) {
                String before = content.substring(0, idx+1);
                String after =
content.substring(content.indexOf(idx, "~"));
                edibytes = (before + newzip +
after).getBytes( );
            }
        }
    }
}
```

Instead, the EDI object model 520 breaks up the same EDI document 532 into a set of structures which represent the business objects in the transaction in a much easier way to read, as in the following example:

```
byte[ ] edibytes = ...
EDIInterchange document = EDIInterchange.parse(edibytes);
Hipaa837pDocument doc837 = (Hipaa837pDocument) document.get(0);
Loop2000B subscriber = doc837.getChild(0).getChild(56);
subscriber.getLoop2010BA( ).getN4( ).setN403("78757");
edibytes = document.emit( );
```

The EDI document 532 at the textual level, as shown above, is complex, error prone, and not at all obvious about what the code is trying to do.

However, as the example above shows, the EDI object model 520 is relatively easy to understand. It shows what the code is doing and working with it would be far less error prone, assuming that the reader understands the HIPAA 837P document structure.

X12 Code

Figure 6:
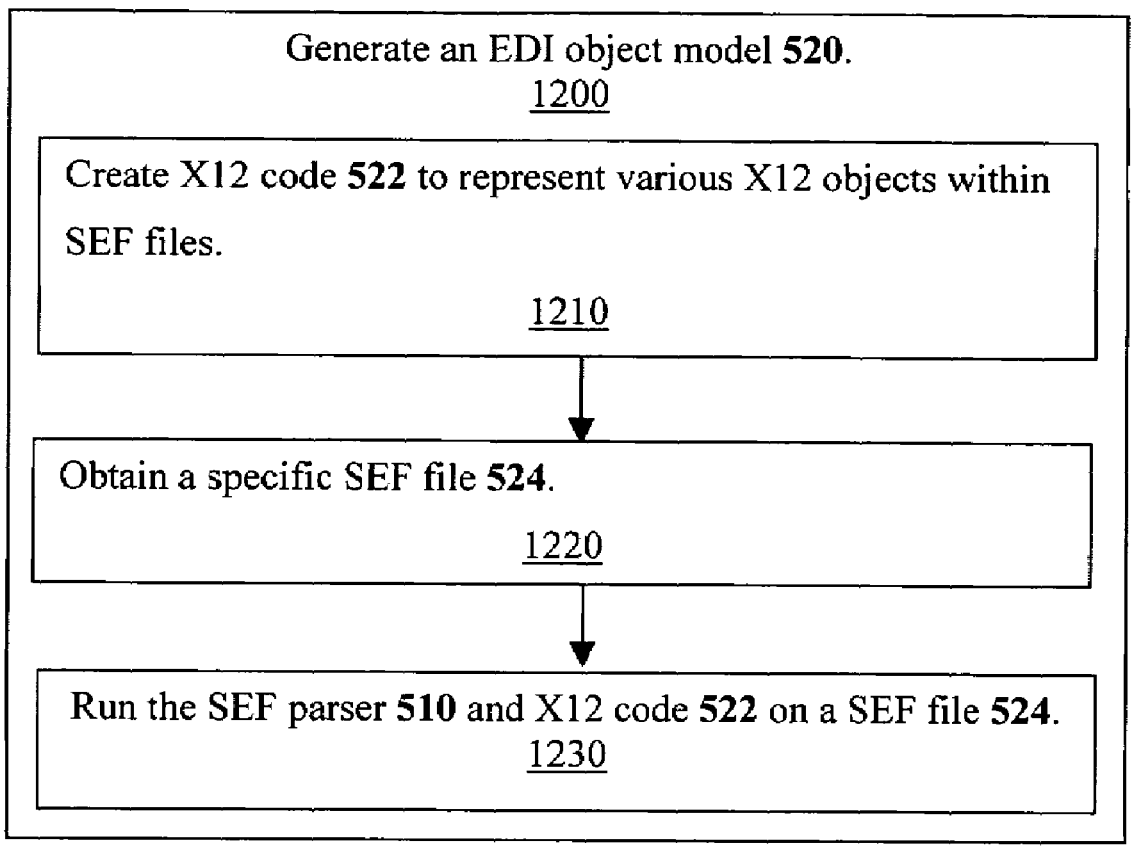
FIG. 6 is a flow chart that illustrates a process for generating an EDI object model.

FIG. 6 shows the steps in one embodiment for generating an EDI object model 520.

Step 1210 in FIG. 6. Create X12 code 522 to represent various X12 objects within SEF files.

A programmer may write a software program comprising X12 code 522 to represent various X12 objects detailed in SEF files, such as loops, segments, fields, and composite fields. The X12 code 522 knows how to generate a Java object that corresponds to an object described in a SEF file 524.

Example of X12 Code

Continuing with the specific example given above to show the advantages of an EDI object model, the following is an example of X12 code 522. This segment of X12 code 522 is written so that when a SEF parser 510, shown in FIG. 2, reaches the N4 line of a SEF file 524, the SEF parser 510 will create an X12Segment object which represents that N4 segment.

```
public class X12Segment extends X12Element {
    private List fields = null;
    public List getFields( ) {
        if (fields == null) {
            return Collections.EMPTY_LIST;
        }
        return fields;
    }
    public void addField(X12FieldReference ref) {
        if (fields == null) {
            fields = new ArrayList( );
        }
        ref.setName(getName( ) +
getPaddedNumber(currentField++));
        fields.add(ref);
    }
```

This object will have a name ("N4") and a set of fields associated with it, among other fields. When the SEF parser 510 sees a new field ([19], [156], etc), it will call the addField( ) method to add a field to the X12Segment object. This will add fields "N401", "N402", "N403", etc. to the object. Once this X12 segment object has been completely parsed, it can emit a Java file which can inherently read and write an N4 segment:

```
public void emit(String xaType, X12Mask mask, int idx) throws
IOException {
    out.println("package com.webify.shared.edi.model.hipaa" +
xaType + ".beans;");
    out.println( );
    out.println("import com.webify.shared.edi.model.*;");
    out.println("import java.io.*;");
    out.println("import java.util.*;");
    out.println("import org.apache.commons.logging.Log;");
    out.println("import
org.apache.commons.logging.LogFactory;");
    out.println( );
    out.println("/*");
    out.println(" * AUTOGENERATED FILE -
DO NOT EDIT!!!");
    out.println(" */");
    out.println("public class " + classname + " implements
EDIElement {");
    out.println("\tprivate static final Log log =
LogFactory.getLog(" + classname + ".class);");
    out.println( );
    out.println("\tpublic static final String SEGMENT_NAME =
\"" + name + "\";");
    out.println("\tpublic static final int FIELD_COUNT = " +
fieldCount + ";");
    out.println( );
    out.println("\tprivate int lineNumber = 0;");
    out.println("\tpublic int getLineNumber( ) { return
lineNumber; }");
    out.println("\t/** Do NOT use this method - it is not
```

-continued

```
public by choice... */");
        out.println("\tpublic void setLineNumber(int foo) {
lineNumber = foo; }");
        out.println( );
        out.println("\tprivate int ordinal = 0;");
        out.println("\tpublic int getOrdinal( ) { return ordinal;
}");
        out.println("\tvoid setOrdinal(int ord) { ordinal = ord;
}");
        out.println( );
        out.println("\t// Fields");
        i = 0;
        for (Iterator it = getFields( ).iterator( ); it.hasNext( );
i++) {
            X12FieldReference ref = (X12FieldReference)
it.next( );
            if (ref.isUsed(mask, i)) {
                ref.emit(xaType, out, mask, i);
            }
        }
        out.println( );
```

Obtain a SEF File

Step 1220 in FIG. 6. Obtain a specific SEF file 524.

As mentioned above, many SEF files for EDI documents are available openly on the Internet. For example, a party at server 1 100, shown in FIG. 2, could use link 142, network 130, and link 143 to obtain a SEF file 524 for an 827P interchange document from another computer such as server 2 182.

Run SEF Parser and X12 Code on SEF File

Step 1230 in FIG. 6. Run the SEF parser 510 and X12 code 522 on a SEF file 524.

A programmer may run the SEF parser 510, as shown in FIG. 2, and X12 code 522 on a specific SEF file 524 to automatically generate an EDI object model 520 for that SEF file 524.

Example of an EDI Object Model

Continuing with the running examples given above to show the advantages of an EDI object model and to illustrate X12 code, the following is an example of an EDI object model 520.

```
package com.webify.shared.edi.model.hipaa837p.beans;
import com.webify.shared.edi.model.*;
import java.io.*;
import java.util.*;
import org.apache.commons.logging.Log;
import org.apache.commons.logging.LogFactory;
/*
 * AUTOGENERATED FILE - DO NOT EDIT!!!
 */
public class SegmentN4_1 implements EDIElement {
  private static final Log log =
LogFactory.getLog(SegmentN4_1.class);
  public static final String SEGMENT_NAME = "N4";
  public static final int FIELD_COUNT = 4;
  private int lineNumber = 0;
  public int getLineNumber( ) { return lineNumber; }
  /** Do NOT use this method - it is not public by choice... */
  public void setLineNumber(int foo) { lineNumber = foo; }
  private int ordinal = 0;
  public int getOrdinal( ) { return ordinal; }
  void setOrdinal(int ord) { ordinal = ord; }
  // Fields
  private String N401;
  public String getN401( ) { return N401; }
  public void setN401(String val) { N401 = val; }
  private String N402;
  public String getN402( ) { return N402; }
```

-continued

```
  public void setN402(String val) { N402 = val; }
  private String N403;
  public String getN403( ) { return N403; }
  public void setN403(String val) { N403 = val; }
  private String N404;
  public String getN404( ) { return N404; }
  public void setN404(String val) { N404 = val; }
  public void parse(EDIInputStream eis) throws IOException {
    lineNumber = eis.getCurrentSegmentNumber( );
    if (log.isDebugEnabled( )) log.debug("Starting segment N4 on
line " + lineNumber);
    String[ ] fields = eis.readSegment(SEGMENT_NAME,
FIELD_COUNT);
    N401 = eis.getStringValue(fields, 1, 2, 30, true);
    if (N401 == null || "".equals(fields[1].trim( ))) {
      eis.addError("Field 'N401' missing");
    }
    N402 = eis.getStringValue(fields, 2, 2, 2, true);
    if (N402 == null || "".equals(fields[2].trim( ))) {
      eis.addError("Field 'N402' missing");
    }
    N403 = eis.getStringValue(fields, 3, 3, 15, true);
    if (N403 == null ||"".equals(fields[3].trim( ))) {
      eis.addError("Field 'N403' missing");
    }
    N404 = eis.getStringValue(fields, 4, 2, 3, false);
    validate(eis);
  }
  protected void validate(EDIInputStream eis) {
  }
  public void emit(EDIOutputStream eos) throws IOException {
    eos.startSegment("N4");
    if (N401 == null) {
      eos.addError("Emitting null mandatory field 'N401'");
    }
    eos.writeField(N401);
    if (N402 == null) {
      eos.addError("Emitting null mandatory field 'N402'");
    }
        eos.writeField(N402);
    if (N403 == null) {
      eos.addError("Emitting null mandatory field 'N403'");
    }
    eos.writeField(N403);
    eos.writeField(N404);
    eos.writeNullField( );
    eos.writeNullField( );
    eos.endSegment( );
  }
  public EDIElement createCopy( ) {
    SegmentN4_1 copy = new SegmentN4_1( );
    copy.setLineNumber(this.lineNumber);
    copy.N401 = this.N401;
    copy.N402 = this.N402;
    copy.N403 = this.N403;
    copy.N404 = this.N404;
    return copy;
  }
}
```

Notice the Line in the parse( ) Method:

N403=eis.getStringValue(fields, 3, 3, 15, true);

Notice the 3, 3, 15 and true. This means:

3: the value is the third field in the segment

3: minimum size

15: maximum size true: value is required

These parameters allow the getStringValue( ) method to automatically do simple field validation to ensure the document is well-formed. Note that the object model does not validate the actual value to ensure that it is a real zip code. This is because there is no pre-defined list of legal values. One knows that the value is a codeset, but one does not have access to that codeset. Validation of codeset values has to happen externally to this object model. Note the empty validate( ) method in the Java code—this could be modified by the application developer to validate the value of N403 against a list of USPS zip codes which the developer has purchased.

Working with an EDI Transaction

Returning to FIG. 3, after creating parsing tools in Step 1000, a programmer may continue to the following step:

Step 2000 in FIG. 3. Work efficiently with an EDI transaction 534.

Figure 7:
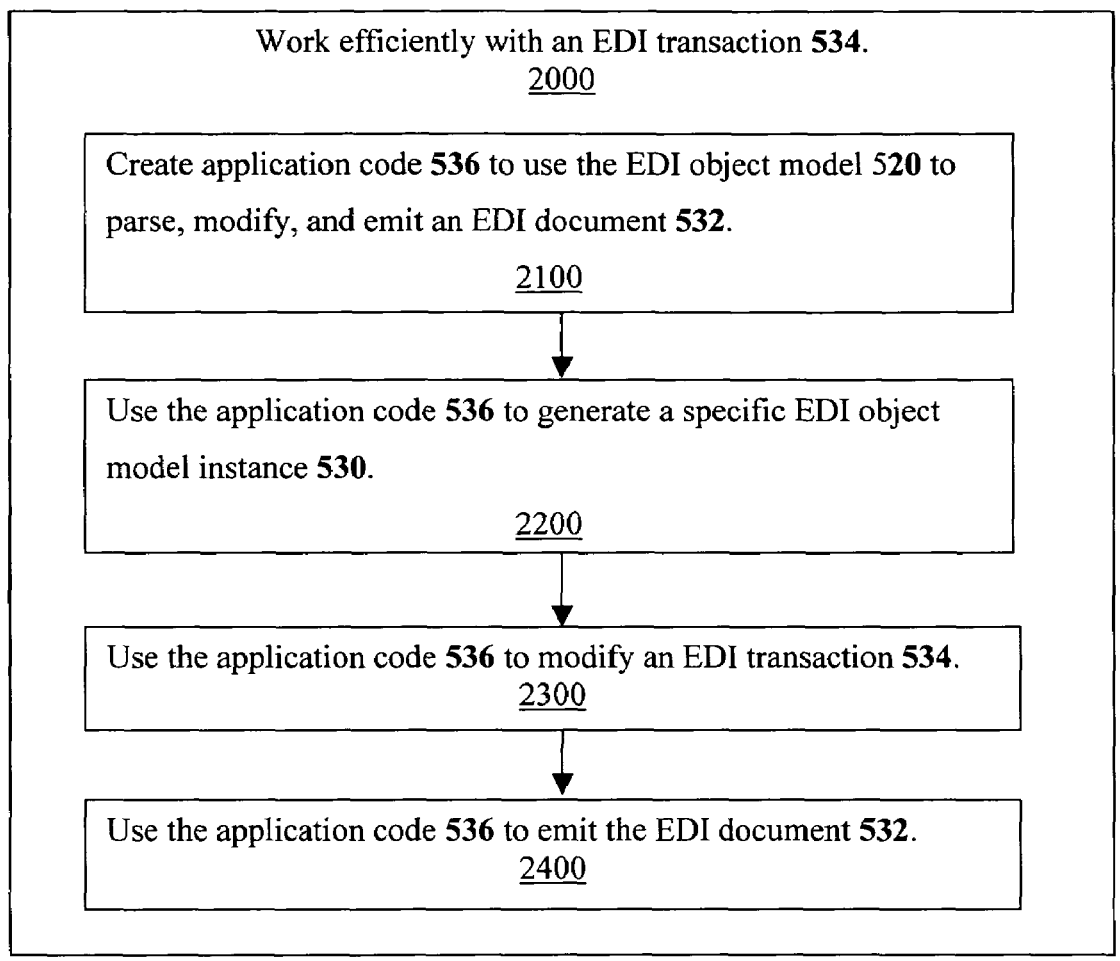
FIG. 7 is a flow chart that illustrates a process for working efficiently with an EDI transaction.

FIG. 7 shows the steps in one embodiment for working with an EDI transaction 534.

Step 2100 in FIG. 7. Create application code 536 to use the EDI object model 520 to parse, modify, and emit an EDI document 532.

Parsing

In an embodiment, a programmer may write application code 536 to use the EDI object model 520, shown in FIG. 2, to automatically parse an EDI document 532 and generate in memory an EDI object model instance 530 for that EDI document 532, explained in more detail below.

Modifying

In an embodiment, the application code 536 may also be designed to automatically employ the EDI object model instance 520 to efficiently process, for example read and manipulate, the EDI document's 532 EDI transaction 534 in a desired way. For example, a programmer might include in the application code 536 an error-checking program for an EDI transaction 534 in an 837P interchange document 532 to compare patient names and zip codes in claims with those in a central database and identify and correct errors.

In another embodiment, the application code 536 may be designed to automatically employ the EDI object model instance 520 to transform the EDI document's 532 data to another format, for example to display the data on a Web page.

Emitting

In addition, the application code 536 may be designed in an embodiment to automatically employ the EDI object model 520 on the EDI object model instance 530 to emit the EDI document 532 for further use.

Example of Application Code

The following is an example of application code 536, shown in Step 2100 in FIG. 7 in one embodiment, designed to parse an EDI document 532, shown in FIG. 2, into an EDI object model instance 530, to modify an EDI transaction 534 by correcting errors in patients' names, and to emit the EDI document 532 for further use:

```
public byte[ ] sampleEdit(byte[ ] edibytes) throws IOException,
EDIParseException {
    // parse the EDI bytes into an EDI object model instance
    EDIInterchange interchange = EDIInterchange.parse (edibytes);
    // get the first transaction in the interchange (we assume it is
an 837P)
    Hipaa837pDocument claimsDoc = (Hipaa837pDocument)
interchange.getDocuments( ).get(0);
    // We descend the various loops within the 837P document as
described in the SEF.
    // 2000A -> 2000B -> 2000C -> 2010CA -> NM1 -> NM103
(Patient's Last Name)
    // This gets the patient's last name for the very first claim in
the 837P document
    // and sets it to "Smith" if it is not already Smith.
    SegmentNM1_8 nm1 =
```

-continued

```
claimsDoc.getChild(0).getChild(0).getChild(0).getLoop2010CA( ).
getNM1( );
    if (!"Smith".equals(nm1.getNM103( ))) {
    nm1.setNM103("Smith");
    }
        // Emit the modified EDI document
    return interchange.emit( );
    }
```

EDI Object Model Instance

Returning to FIG. 7, after creating application code 536, the next step in this process in an embodiment is the following:

Step 2200 in FIG. 7. Use the application code 536 to generate a specific EDI object model instance 530.

An EDI object model instance 530, as shown in FIG. 2, is a hierarchical structure of objects that organizes the data in an EDI transaction 534 contained in a specific EDI document 532 and makes the EDI document 532 more efficient to process, for example to read and modify.

For example, a programmer could use an EDI object model instance 530 to automatically correct zip code errors in an 837P interchange document for filing patient claims.

FIG. 8 shows the steps for generating a specific EDI object model instance 530 in Step 2200 of FIG. 7.

Step 2210 in FIG. 8. Obtain a specific EDI document 532.

Typically a business receives an EDI document 532 through electronic transmission. For example, server 1 100 in FIG. 2 might receive an EDI document 532 from another server, such as server 2 182, over link 143, network 130, and link 142. In other embodiments a business could receive an EDI document 532 through a CD, other storage disc, or multiple other means.

Step 2220 in FIG. 8. run the application code 536 to use the EDI object model 520 on the EDI document 532.

At runtime, the application code 536 employs the EDI object model to automatically parse an EDI document 532 and generate an EDI object model instance 530 for that EDI document 532.

Modifying an EDI Transaction

Returning to FIG. 7, the process continues in an embodiment to the following steps:

Step 2300 in FIG. 7. Use the application code 536 to modify an EDI transaction 534.

At runtime, the application code 536 automatically carries out the specified modification automatically and efficiently. For example, as indicated above the application code 536 might instigate an error-checking program for an EDI transaction 534 in an 837P interchange document 532 to compare patient names and zip codes in claims with those in a central database and identify and correct errors.

Emitting the EDI Document

Step 2400 in FIG. 8. Use the application code 536 to emit the EDI document 532.

At runtime, the application code 536 automatically uses the EDI object model 520, shown in FIG. 2, on the EDI object model instance 530 to emit the EDI document 532 for further use, for example in a chained system.

Overview of Process

Figure 9:
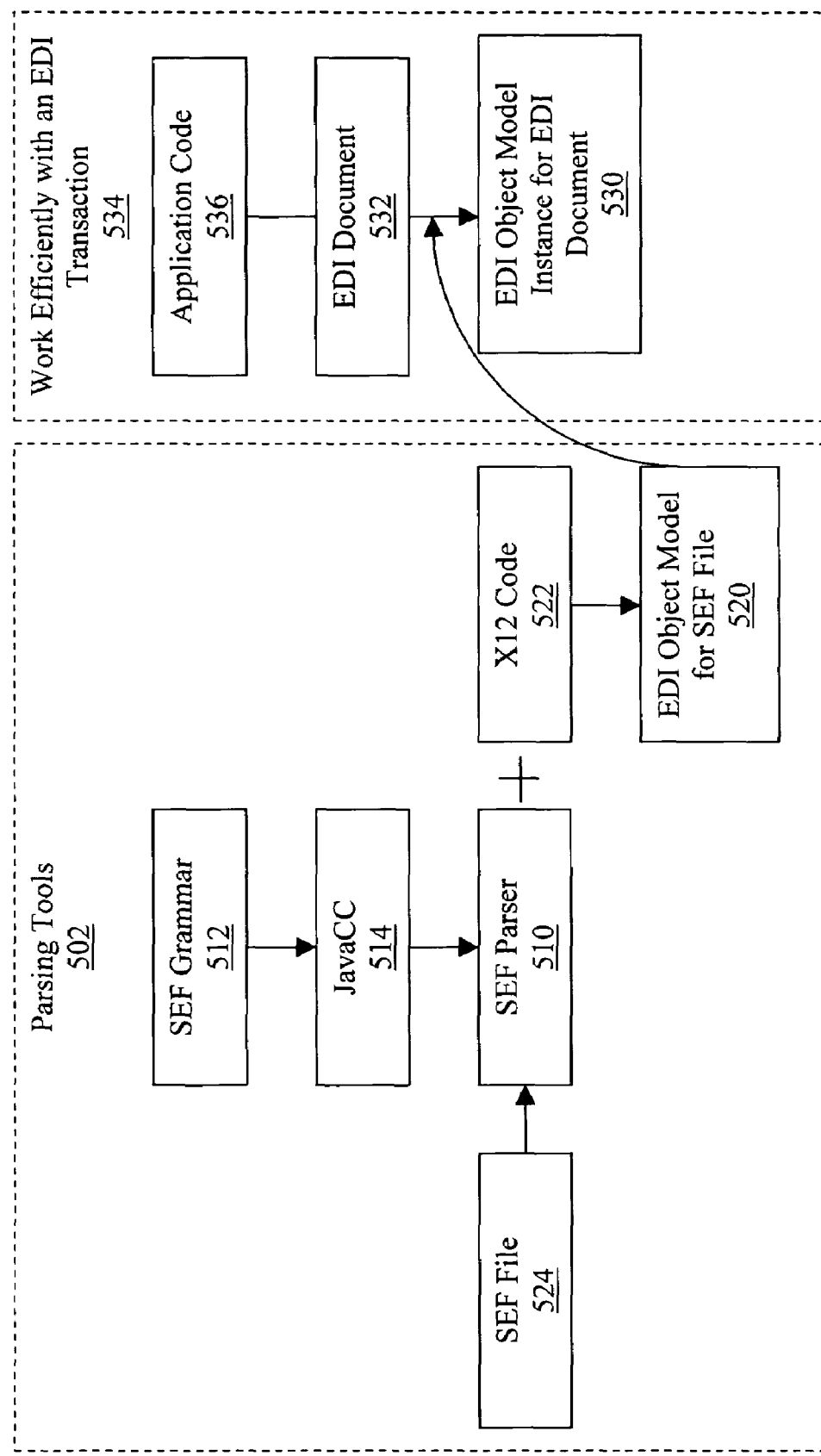
FIG. 9 is a flow chart that illustrates the overall elements and process of the present invention.

FIG. 9 shows an overview of the principal elements and steps used with the present invention in an embodiment.

Parsing tools 502 are created.
  A SEF grammar 512 is written.
  JavaCC is obtained.
  The SEF grammar is run with JavaCC to autogenerate a SEF parser 510.
  X12 code 522 is written.
  A SEF file 524 is obtained.
  The SEF file 524 is processed by the SEF parser 510 and the X12 code 522 to generate an EDI object model 520 for the SEF file 524.
Work is performed efficiently on an EDI transaction 534.
  Application code 536 is written.
  An EDI document 532 is obtained.
  The application code 536 is run with the EDI object model 520 on an EDI document 532 to create in memory an EDI object model instance 530. At this point the application code 536 can efficiently be run on the EDI object model instance 530 to perform desired work.

Alternate Operating Environment

Figure 10:
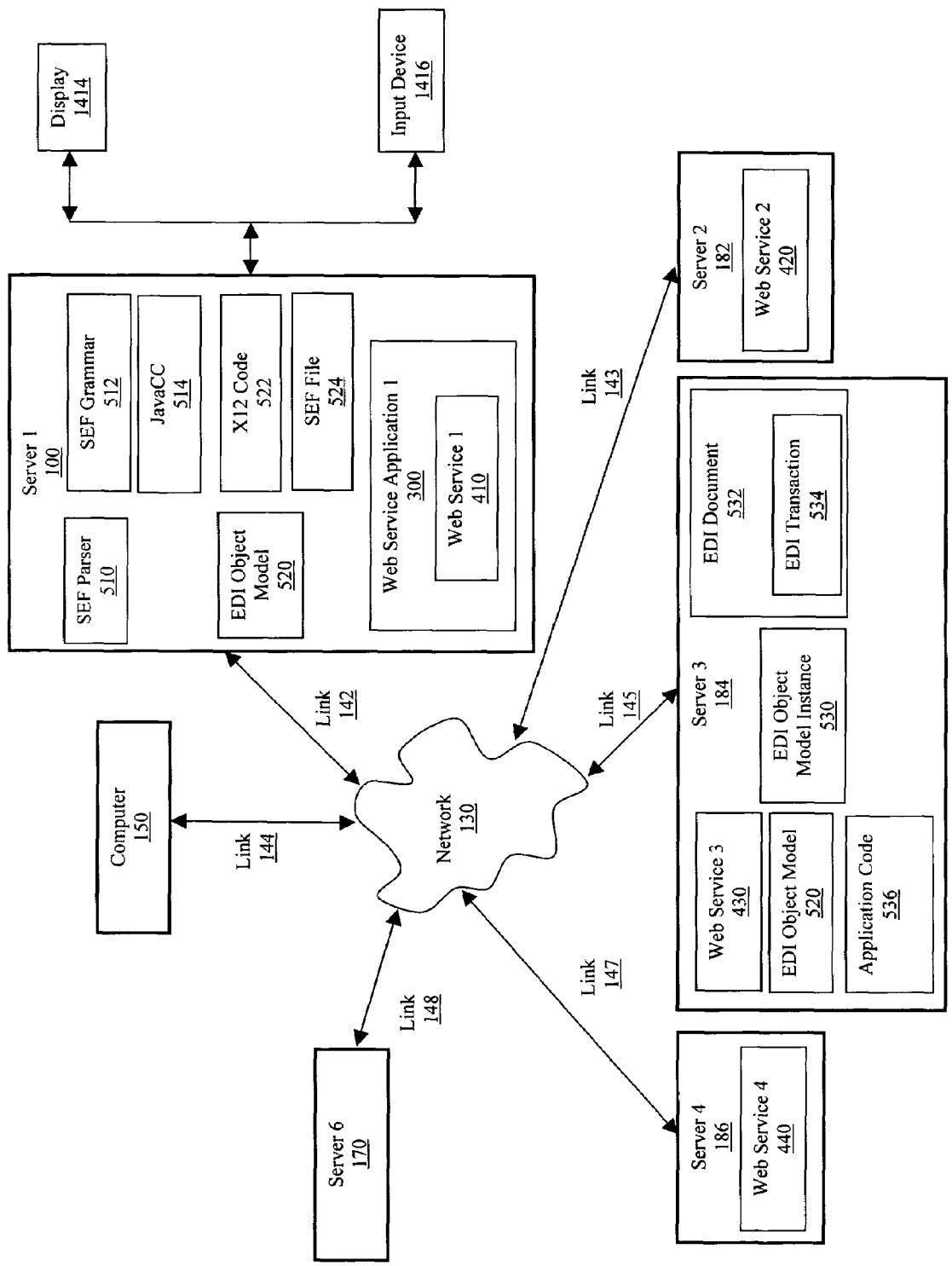
FIG. 10 is a block diagram showing an alternate operating environment in which embodiments of the present invention may be employed.

An alternate operating environment of the present invention, related to the example illustrated in FIG. 1, is shown in FIG. 10. A party employs a server 100 to run a Web service application 300, which uses multiple chained Web services 410, 420, 430, 440 located on multiple servers 100, 182, 184, and 186. The servers may be personal computers or larger computerized systems.

The Web services 410, 420, 430, 440 communicate through a wired or wireless network 130 and wired or wireless links 142, 143, 145, 147, and 148. The network 130 may be the Internet, a private LAN (Local Area Network), a wireless network, a TCP/IP (Transmission Control Protocol/Internet Protocol) network, or other communications system, and may comprise multiple elements such as gateways, routers, and switches. The links 142, 143, 145, 147, and 148 are compatible with the technology used for network 130.

In an embodiment, a programmer uses input device 1416 and display 1414 to create a SEF grammar 512, which is used with JavaCC 514 to autogenerate a SEF parser 510. The SEF parser 510 and X12 code 522 are then run on a specific SEF file 524, which in one embodiment could be obtained over the Internet, to generate an EDI object model 520.

The EDI object model 520 can then be used on an EDI document 532 on any server. For example, EDI object model 520 could be sent from server 100 over link 142, network 130, and link 145 to server 3 184 and Web service 3 430. A programmer at Web service 3 430 could then write application code 536 to use the EDI object model 520 to parse a specific EDI document 532 and generate an EDI object model instance 530. At runtime, the application code 536 would use the EDI object model instance 530 to efficiently read and manipulate data in the EDI transaction 534 as specified and would also emit the EDI document 532 for further use.

In other embodiments, multiple elements of this system could be created on multiple loosely connected computers and exchanged for use.

Computer System Overview

Figure 11:
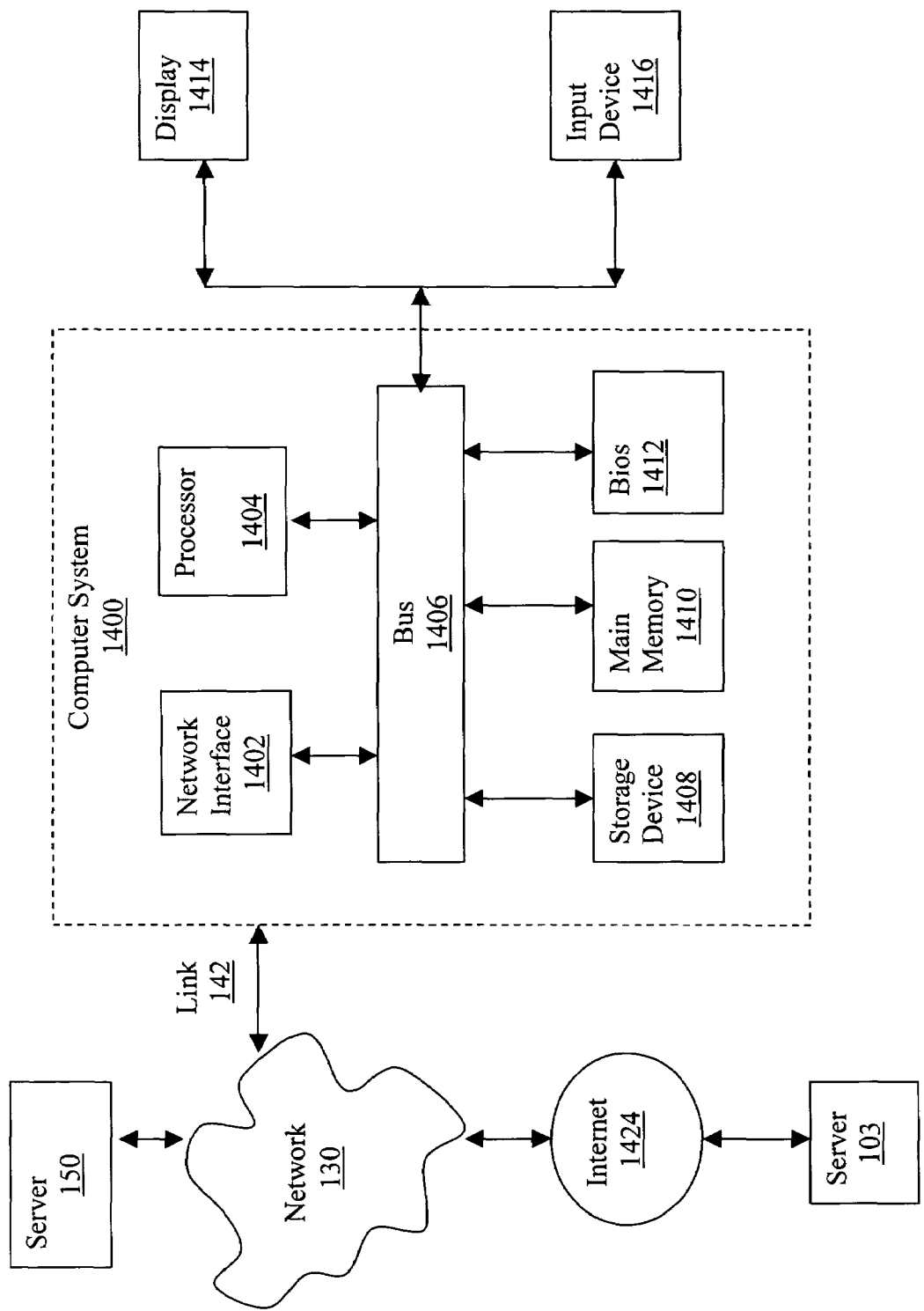
FIG. 11 is a block diagram that illustrates a typical computer system, representing a server on which embodiments of the present invention can be implemented.

FIG. 11 is a block diagram that illustrates a typical computer system 1400, well known to those skilled in the art, representing a server 100, shown in FIG. 2, on which embodiments of the present invention can be implemented. This computer system 1400, shown in FIG. 10, comprises a network interface 1402 that provides two-way communications through a wired or wireless link 142 to a wired or wireless communications network 130 that uses any applicable communications technology. For example, the network 130 can comprise a public telephone network, a wireless network, a local area network (LAN), and any known or not-yet-know applicable communications technologies, using correspondingly applicable links. The network 130 in turn provides communications with one or more host computers 150 and, through the Internet 1424, with one or more servers 103.

The network interface 1402 is attached to a bus 1406 or other means of communicating information. Also attached to the bus 1406 are the following:
  a processor 1404 for processing information;
  a storage device 1408, such as an optical disc, a magneto-optical disc, or a magnet disc, for storing information and instructions;
  main memory 1410, which is a dynamic storage device such as a random access memory (RAM) that stores information and instructions to be carried out by processor 1404;
  a bios 1412 or another form of static memory such as read only memory (ROM), for storing static information and instructions to be carried out by processor 1404;
  a display 1414, such as a liquid crystal display (LDC) or cathode ray tube (CRT) for displaying information to user of the computer system 1400; and
  an input device 1416, with numeric and alphanumeric keys for communicating information and commands to processor 1404. In another embodiment a mouse or other input devices can also be used.

The computer system 1400 is used to implement the methods of the present invention in one embodiment. However, embodiments of the present invention are not limited to specific software and hardware configurations. Computer system 1400 can receive data from computer 150 and server 103 through a network 130 such as the Internet, and appropriate links 142, such as wired or wireless ones, and its network interface 1402. It can of course transmit data back to computers over the same routes.

Computer system 1400 carries out the methods of the present invention when its processor 1404 processes instructions contained in its main memory 1410. Another computer-readable medium, such as its storage device 1408, may read these instructions into main memory 1410 and may do so after receiving these instructions through network interface 1402. Processor 1404 further processes data according to instructions contained in its storage device 1408. Data is relayed to appropriate elements in computer system 1400 through its bus 1406. Instructions for computer system 1400 can also be given through its input device 1416 and display 1414.

"Computer-readable medium" refers to any medium that provides instructions to processor 1404, comprising volatile, non-volatile, and transmission media. Volatile media comprise dynamic memory, such as main memory 1410. Non-volatile media comprise magnetic, magneto-optical, and optical discs, such as storage device 1408. Transmission media comprise a wide range of wired and unwired transmission technology, comprising cables, wires, modems, fiber optics, acoustic waves, such as radio waves, for example, and light waves, such as infrared, for example. Typical examples of widely used computer-readable media are floppy discs, hard discs, magnetic tape, CD-ROMs, punch cards, RAM, EPROMs, FLASH-EPOMs, memory cards, chips, and cartridges, modem transmissions over telephone lines, and infrared waves. Multiple computer-readable may be used, known and not yet known, can be used, individually and in combinations, in different embodiments of the present invention.

It will also be apparent to those skilled in the art that different embodiments of the present invention may employ a wide range of possible hardware and of software techniques.

For example the communication between servers could take place through any number of links, including wired, wireless, infrared, or radio ones, and through other communication networks beside those cited, including any not yet in existence.

Also, the term computer is used here in its broadest sense to include personal computers, laptops, telephones with computer capabilities, personal data assistants (PDAs) and servers, and it should be recognized that it could include multiple servers, with storage and software functions divided among the servers. A wide array of operating systems, compatible e-mail services, Web browsers and other communications systems can be used to transmit messages among servers.

Furthermore, in the previous description the order of processes, their numbered sequences, and their labels are presented for clarity of illustration and not as limitations on the present invention.

What is claimed is:

1. A method for automating the processing of business transaction data for Electronic Data Interchange (EDI) transactions comprising:
   creating a Standard Exchange Format (SEF) parser that interprets the format of a corresponding SEF file, wherein the SEF file includes information relating to EDI transaction elements associated with a corresponding EDI document;
   generating an EDI object model for the SEF file by parsing at least the SEF file using the created SEF parser such that the EDI object model includes code that represents the data structures of the corresponding SEF file; and
   conveying the EDI object model so as to be utilized by a programmer to create application code to process business transaction data for EDI documents by generating a specific EDI object model instance of the EDI object model and wherein the EDI object model instance is utilized to process the business transaction data.

2. The method of claim 1 further comprising using the SEF parser to create X12 code to represent various X12 objects within the SEF file.

3. The method of claim 2 wherein generating an EDI object model for the SEF file further comprises:
   obtaining a specific SEF file and running the SEF parser and the X12 code on the SEF file to automatically generate the EDI object model.

4. The method of claim 1 wherein creating a SEF parser comprises:
   creating a SEF grammar;
   obtaining JavaCC; and
   autogenerating the SEF parser using the SEF grammar and the obtained JavaCC.

5. The method of claim 1 wherein using the created SEF parser such that the EDI object model includes code that represents the data structures of the corresponding SEF file further comprises using the SEF parser to break up the EDI document into a set of structures which represent business objects in the transaction in a readable manner.

6. A method for automating the processing of business transaction data for Electronic Data Interchange (EDI) transactions comprising:
   providing a Standard Exchange Format (SEF) parser that interprets the format of a corresponding SEF file, wherein the SEF file includes information relating to EDI transaction elements associated with a first corresponding EDI document and a second corresponding EDI document;
   generating an EDI object model for the SEF file by parsing at least the SEF file using the SEF parser such that the EDI object model includes code that represents the data structures of the corresponding SEF file; and
   conveying the EDI object model for the SEF file so as to be utilized by a programmer to process business transaction data for the first EDI document and to process the business transaction data for the second EDI document.

7. The method of claim 6 further comprising:
   utilizing the EDI object model by the programmer to create a first application code to process the business transaction data for the first EDI document by generating a first EDI object model instance of the EDI object model; and
   utilizing the first EDI object model instance to process the business transaction data for the first EDI document.

8. The method of claim 7 further comprising using the first application code to modify an EDI object model instance.

9. The method of claim 7 further comprising using the first application code to emit the object model instance to the first EDI document.

10. The method of claim 7 further comprising using the first application code to parse the first EDI document.

11. The method of claim 6 further comprising using the SEF parser to create X12 code to represent various X12 objects within the SEF file.

12. The method of claim 11 wherein generating an EDI object model for the SEF file further comprises:
   obtaining a specific SEF file and running the SEF parser and the X12 code on the SEF file to automatically generate the EDI object model.

13. The method of claim 6 further comprising:
   utilizing the EDI object model by the programmer to create a second application code to process the business transaction data for the second EDI document by generating a second EDI object model instance of the EDI object model; and
   utilizing the second EDI object model instance to process the business transaction data for the second EDI document.

14. A method for using an Electronic Data Interchange (EDI) object model for processing business transaction data comprising:
   obtaining an EDI object model for a Standard Exchange Format (SEF) file associated with at least one EDI document, the SEF file including information relating to EDI transaction elements associated with an EDI document, wherein the EDI object model is created by parsing at least the SEF file using a SEF parser such that the EDI object model includes code that represents the data structures of the corresponding SEF file;
   creating application code to process the business transaction data for the EDI document;
   using the application code and the EDI object model to generate an EDI object model instance for the SEF file; and
   processing the business transaction data for the EDI document with the EDI object model instance.

15. The method of claim 14 wherein using the application code further comprises using the application code for modifying an EDI transaction.

16. The method of claim 14 wherein using the application code further comprises using the application code for emitting the EDI document.

17. The method of claim 14 wherein using the application code further comprises using the application code for parsing the EDI document.

18. The method of claim 14 wherein using the application code and an EDI object model to generate an EDI object model instance further comprises:
- obtaining the EDI document; and
- running the application code to use the EDI object model on the EDI document.

19. A method for generating an EDI object model instance for processing business transaction data for Electronic Data Interchange (EDI) transactions comprising:
- creating parsing tools for a Standard Exchange Format (SEF) file that includes information relating to EDI transaction elements associated with a corresponding EDI document by:
  - creating a SEF parser that interprets the format of the SEF file, wherein creating the SEF parser comprises creating a SEF grammar and creating X12 code to represent various X12 objects within the SEF file; and
  - generating an EDI object model for the SEF file by obtaining a specific SEF file and running the SEF parser and the X12 code on the SEF file to automatically generate the EDI object model; and
- conveying the parsing tools such that the EDI object model is utilized by a programmer to create application code to process business transaction data for EDI documents by generating a specific EDI object model instance.

20. A method for automating the processing of business transaction data for Electronic Data Interchange (EDI) transactions comprising:
- creating parsing tools for a Standard Exchange Format (SEF) file that includes information relating to EDI transaction elements associated with a corresponding EDI document by:
  - creating a SEF parser that interprets the format of the SEF file, wherein creating the SEF parser comprises creating a SEF grammar, obtaining JavaCC, and auto-generating the SEF parser using the SEF grammar and the obtained JavaCC; and
  - generating an EDI object model for the SEF file by obtaining the SEF file, creating X12 code to represent various X12 objects within the SEF file, and running the SEF parser and the X12 code on the SEF file to automatically generate the EDI object model; and
- conveying the parsing tools such that the EDI object model is utilized by a programmer to create application code to process business transaction data for EDI documents by generating a specific EDI object model instance by obtaining the EDI document and running the application code to use the EDI object model on the EDI document;
- wherein the specific EDI object model instance is utilized to process the business transaction data.

* * * * *